US008442276B2

(12) United States Patent
Hamza

(10) Patent No.: US 8,442,276 B2
(45) Date of Patent: May 14, 2013

(54) INVARIANT RADIAL IRIS SEGMENTATION

(75) Inventor: Rida M. Hamza, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1812 days.

(21) Appl. No.: 11/372,854

(22) Filed: Mar. 10, 2006

(65) Prior Publication Data

US 2007/0211924 A1 Sep. 13, 2007

Related U.S. Application Data

(60) Provisional application No. 60/778,770, filed on Mar. 3, 2006.

(51) Int. Cl.
*G06K 9/00* (2006.01)

(52) U.S. Cl.
USPC .......................................................... 382/117

(58) Field of Classification Search ..... 382/117; 348/78; 351/209, 210, 211, 212; 396/18, 51, 158
See application file for complete search history.

(56) References Cited

U.S. PATENT DOCUMENTS

| 4,641,349 | A | | 2/1987 | Flom et al. |
| 4,836,670 | A | | 6/1989 | Hutchinson |
| 5,231,674 | A | * | 7/1993 | Cleveland et al. ............ 382/117 |
| 5,291,560 | A | | 3/1994 | Daugman |
| 5,293,427 | A | | 3/1994 | Ueno et al. |
| 5,359,382 | A | | 10/1994 | Uenaka |
| 5,404,013 | A | | 4/1995 | Tajima |
| 5,551,027 | A | | 8/1996 | Choy et al. |
| 5,572,596 | A | | 11/1996 | Wildes et al. |
| 5,608,472 | A | | 3/1997 | Szirth et al. |

(Continued)

FOREIGN PATENT DOCUMENTS

| EP | 0484076 | 5/1992 |
| EP | 0593386 | 4/1994 |

(Continued)

OTHER PUBLICATIONS

Ma et al., "Local Intensity Variation Analysis for Iris Recognition," Pattern Recognition Society37, pp. 1287-1298, 2004.

(Continued)

*Primary Examiner* — Brian Le
(74) *Attorney, Agent, or Firm* — Seager Tufte & Wickhem LLC

(57) ABSTRACT

A method and computer product are presented for identifying a subject by biometric analysis of an eye. First, an image of the iris of a subject to be identified is acquired. Texture enhancements may be done to the image as desired, but are not necessary. Next, the iris image is radially segmented into a selected number of radial segments, for example 200 segments, each segment representing 1.8° of the iris scan. After segmenting, each radial segment is analyzed, and the peaks and valleys of color intensity are detected in the iris radial segment. These detected peaks and valleys are mathematically transformed into a data set used to construct a template. The template represents the subject's scanned and analyzed iris, being constructed of each transformed data set from each of the radial segments. After construction, this template may be stored in a database, or used for matching purposes if the subject is already registered in the database.

36 Claims, 4 Drawing Sheets

U.S. PATENT DOCUMENTS

| | | | |
|---|---|---|---|
| 5,664,239 | A | 9/1997 | Nakata |
| 5,717,512 | A | 2/1998 | Chmielewski, Jr. et al. |
| 5,751,836 | A | 5/1998 | Wildes et al. |
| 5,859,686 | A | 1/1999 | Aboutalib et al. |
| 5,860,032 | A | 1/1999 | Iwane |
| 5,896,174 | A | 4/1999 | Nakata |
| 5,901,238 | A | 5/1999 | Matsuhita |
| 5,909,269 | A | 6/1999 | Isogai et al. |
| 5,953,440 | A | 9/1999 | Zhang et al. |
| 5,956,122 | A | 9/1999 | Doster |
| 5,978,494 | A | 11/1999 | Zhang |
| 6,005,704 | A | 12/1999 | Chmielewski, Jr. et al. |
| 6,007,202 | A | 12/1999 | Apple et al. |
| 6,012,376 | A | 1/2000 | Hanke et al. |
| 6,021,210 | A | 2/2000 | Camus et al. |
| 6,028,949 | A | 2/2000 | McKendall |
| 6,055,322 | A | 4/2000 | Salganicoff et al. |
| 6,064,752 | A | 5/2000 | Rozmus et al. |
| 6,069,967 | A | 5/2000 | Rozmus et al. |
| 6,081,607 | A | 6/2000 | Mori et al. |
| 6,088,470 | A | 7/2000 | Camus et al. |
| 6,091,899 | A | 7/2000 | Konishi et al. |
| 6,101,477 | A | 8/2000 | Hohle et al. |
| 6,104,431 | A | 8/2000 | Inoue et al. |
| 6,108,636 | A | 8/2000 | Yap et al. |
| 6,119,096 | A | 9/2000 | Mann et al. |
| 6,120,461 | A | 9/2000 | Smyth |
| 6,134,339 | A * | 10/2000 | Luo .............................. 382/115 |
| 6,144,754 | A | 11/2000 | Okano et al. |
| 6,246,751 | B1 | 6/2001 | Bergl et al. |
| 6,247,813 | B1 | 6/2001 | Kim et al. |
| 6,252,977 | B1 | 6/2001 | Salganicoff et al. |
| 6,282,475 | B1 | 8/2001 | Washington |
| 6,285,505 | B1 | 9/2001 | Melville et al. |
| 6,285,780 | B1 | 9/2001 | Yamakita et al. |
| 6,289,113 | B1 | 9/2001 | McHugh et al. |
| 6,299,306 | B1 | 10/2001 | Braithwaite et al. |
| 6,308,015 | B1 | 10/2001 | Matsumoto |
| 6,309,069 | B1 | 10/2001 | Seal et al. |
| 6,320,610 | B1 | 11/2001 | Van Sant et al. |
| 6,320,612 | B1 | 11/2001 | Young |
| 6,320,973 | B2 | 11/2001 | Suzaki et al. |
| 6,323,761 | B1 | 11/2001 | Son |
| 6,325,765 | B1 | 12/2001 | Hay et al. |
| 6,330,674 | B1 | 12/2001 | Angelo et al. |
| 6,332,193 | B1 | 12/2001 | Glass et al. |
| 6,344,683 | B1 | 2/2002 | Kim |
| 6,370,260 | B1 | 4/2002 | Pavlidis et al. |
| 6,377,699 | B1 | 4/2002 | Musgrave et al. |
| 6,393,136 | B1 | 5/2002 | Amir et al. |
| 6,400,835 | B1 | 6/2002 | Lemelson et al. |
| 6,424,727 | B1 | 7/2002 | Musgrave et al. |
| 6,424,845 | B1 | 7/2002 | Emmoft et al. |
| 6,433,818 | B1 | 8/2002 | Steinberg et al. |
| 6,438,752 | B1 | 8/2002 | McClard |
| 6,441,482 | B1 | 8/2002 | Foster |
| 6,446,045 | B1 | 9/2002 | Stone et al. |
| 6,483,930 | B1 | 11/2002 | Musgrave et al. |
| 6,484,936 | B1 | 11/2002 | Nicoll et al. |
| 6,490,443 | B1 | 12/2002 | Freeny, Jr. |
| 6,493,669 | B1 | 12/2002 | Curry et al. |
| 6,494,363 | B1 | 12/2002 | Roger et al. |
| 6,503,163 | B1 | 1/2003 | Van Sant et al. |
| 6,505,193 | B1 | 1/2003 | Musgrave et al. |
| 6,506,078 | B1 | 1/2003 | Mori et al. |
| 6,508,397 | B1 | 1/2003 | Do |
| 6,516,078 | B1 | 2/2003 | Yang et al. |
| 6,516,087 | B1 | 2/2003 | Camus |
| 6,516,416 | B2 | 2/2003 | Gregg et al. |
| 6,522,772 | B1 | 2/2003 | Morrison et al. |
| 6,523,165 | B2 | 2/2003 | Liu et al. |
| 6,526,160 | B1 | 2/2003 | Ito |
| 6,532,298 | B1 | 3/2003 | Cambier et al. |
| 6,540,392 | B1 | 4/2003 | Braithwaite |
| 6,542,624 | B1 | 4/2003 | Oda |
| 6,546,121 | B1 | 4/2003 | Oda |
| 6,553,494 | B1 | 4/2003 | Glass |
| 6,580,356 | B1 | 6/2003 | Alt et al. |
| 6,591,001 | B1 | 7/2003 | Oda et al. |
| 6,591,064 | B2 | 7/2003 | Higashiyama et al. |
| 6,594,377 | B1 | 7/2003 | Kim et al. |
| 6,594,399 | B1 | 7/2003 | Camus et al. |
| 6,598,971 | B2 | 7/2003 | Cleveland |
| 6,600,878 | B2 | 7/2003 | Pregara |
| 6,614,919 | B1 | 9/2003 | Suzaki et al. |
| 6,652,099 | B2 | 11/2003 | Chae et al. |
| 6,674,367 | B2 | 1/2004 | Sweatte |
| 6,690,997 | B2 | 2/2004 | Rivalto |
| 6,708,176 | B2 | 3/2004 | Strunk et al. |
| 6,711,562 | B1 | 3/2004 | Ross et al. |
| 6,714,665 | B1 | 3/2004 | Hanna et al. |
| 6,718,049 | B2 | 4/2004 | Pavlidis et al. |
| 6,718,665 | B2 | 4/2004 | Hess et al. |
| 6,732,278 | B2 | 5/2004 | Baird, III et al. |
| 6,734,783 | B1 | 5/2004 | Anbai |
| 6,745,520 | B2 | 6/2004 | Puskaric et al. |
| 6,750,435 | B2 | 6/2004 | Ford |
| 6,751,733 | B1 | 6/2004 | Nakamura et al. |
| 6,753,919 | B1 | 6/2004 | Daugman |
| 6,754,640 | B2 | 6/2004 | Bozeman |
| 6,760,467 | B1 | 7/2004 | Min et al. |
| 6,765,470 | B2 | 7/2004 | Shinzaki |
| 6,766,041 | B2 | 7/2004 | Golden et al. |
| 6,775,774 | B1 | 8/2004 | Harper |
| 6,785,406 | B1 | 8/2004 | Kamada |
| 6,793,134 | B2 | 9/2004 | Clark |
| 6,819,219 | B1 | 11/2004 | Bolle et al. |
| 6,829,370 | B1 | 12/2004 | Pavlidis et al. |
| 6,832,044 | B2 | 12/2004 | Doi et al. |
| 6,836,554 | B1 * | 12/2004 | Bolle et al. .................... 382/116 |
| 6,837,436 | B2 | 1/2005 | Swartz et al. |
| 6,845,879 | B2 | 1/2005 | Park |
| 6,853,444 | B2 | 2/2005 | Haddad |
| 6,867,683 | B2 | 3/2005 | Calvesio et al. |
| 6,873,960 | B1 | 3/2005 | Wood et al. |
| 6,896,187 | B2 | 5/2005 | Stockhammer |
| 6,905,411 | B2 | 6/2005 | Nguyen et al. |
| 6,920,237 | B2 | 7/2005 | Chen et al. |
| 6,930,707 | B2 | 8/2005 | Bates et al. |
| 6,934,849 | B2 | 8/2005 | Kramer et al. |
| 6,950,139 | B2 | 9/2005 | Fujinawa |
| 6,954,738 | B2 | 10/2005 | Wang et al. |
| 6,957,341 | B2 | 10/2005 | Rice et al. |
| 6,972,797 | B2 | 12/2005 | Izumi |
| 6,992,562 | B2 | 1/2006 | Fuks et al. |
| 7,053,948 | B2 | 5/2006 | Konishi |
| 7,071,971 | B2 | 7/2006 | Elberbaum |
| 7,084,904 | B2 | 8/2006 | Liu et al. |
| 7,120,607 | B2 * | 10/2006 | Bolle et al. ...................... 705/64 |
| 7,136,581 | B2 | 11/2006 | Fujii |
| 7,183,895 | B2 | 2/2007 | Bazakos et al. |
| 7,184,577 | B2 | 2/2007 | Chen et al. |
| 7,197,173 | B2 | 3/2007 | Jones et al. |
| 7,204,425 | B2 | 4/2007 | Mosher, Jr. et al. |
| 7,277,561 | B2 | 10/2007 | Shin |
| 7,277,891 | B2 | 10/2007 | Howard et al. |
| 7,298,873 | B2 | 11/2007 | Miller, Jr. et al. |
| 7,315,233 | B2 | 1/2008 | Yuhara |
| 7,362,210 | B2 | 4/2008 | Bazakos et al. |
| 7,362,370 | B2 | 4/2008 | Sakamoto et al. |
| 7,362,884 | B2 | 4/2008 | Willis et al. |
| 7,365,771 | B2 | 4/2008 | Kahn et al. |
| 7,406,184 | B2 | 7/2008 | Wolff et al. |
| 7,414,648 | B2 | 8/2008 | Imada |
| 7,417,682 | B2 | 8/2008 | Kuwakino et al. |
| 7,418,115 | B2 | 8/2008 | Northcott et al. |
| 7,421,097 | B2 | 9/2008 | Hamza et al. |
| 7,443,441 | B2 | 10/2008 | Hiraoka |
| 7,460,693 | B2 | 12/2008 | Loy et al. |
| 7,471,451 | B2 | 12/2008 | Dent et al. |
| 7,486,806 | B2 | 2/2009 | Azuma et al. |
| 7,518,651 | B2 | 4/2009 | Butterworth |
| 7,537,568 | B2 | 5/2009 | Moehring |
| 7,538,326 | B2 | 5/2009 | Johnson et al. |
| 7,542,945 | B2 | 6/2009 | Thompson et al. |
| 7,580,620 | B2 | 8/2009 | Raskar et al. |
| 7,593,550 | B2 | 9/2009 | Hamza |

| | | |
|---|---|---|
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2001/0054154 A1 | 12/2001 | Tam |
| 2002/0010857 A1 | 1/2002 | Karthik |
| 2002/0033896 A1 | 3/2002 | Hatano |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0077841 A1 | 6/2002 | Thompson |
| 2002/0089157 A1 | 7/2002 | Breed et al. |
| 2002/0106113 A1 | 8/2002 | Park |
| 2002/0112177 A1 | 8/2002 | Voltmer et al. |
| 2002/0114495 A1 | 8/2002 | Chen et al. |
| 2002/0130961 A1 | 9/2002 | Lee et al. |
| 2002/0131622 A1 | 9/2002 | Lee et al. |
| 2002/0139842 A1 | 10/2002 | Swaine |
| 2002/0140715 A1 | 10/2002 | Smet |
| 2002/0142844 A1 | 10/2002 | Kerr |
| 2002/0144128 A1 | 10/2002 | Rahman et al. |
| 2002/0150281 A1 | 10/2002 | Cho |
| 2002/0154794 A1 | 10/2002 | Cho |
| 2002/0158750 A1 | 10/2002 | Almalik |
| 2002/0164054 A1 | 11/2002 | McCartney et al. |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0014372 A1 | 1/2003 | Wheeler et al. |
| 2003/0020828 A1 | 1/2003 | Ooi et al. |
| 2003/0038173 A1 | 2/2003 | Blackson et al. |
| 2003/0046228 A1 | 3/2003 | Berney |
| 2003/0053663 A1 | 3/2003 | Chen et al. |
| 2003/0055689 A1 | 3/2003 | Block et al. |
| 2003/0055787 A1 | 3/2003 | Fujii |
| 2003/0058492 A1 | 3/2003 | Wakiyama |
| 2003/0061172 A1 | 3/2003 | Robinson |
| 2003/0061233 A1 | 3/2003 | Manasse et al. |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0076161 A1 | 4/2003 | Tisse |
| 2003/0076300 A1 | 4/2003 | Lauper et al. |
| 2003/0076984 A1 | 4/2003 | Tisse et al. |
| 2003/0080194 A1 | 5/2003 | O'Hara et al. |
| 2003/0091215 A1 | 5/2003 | Lauper et al. |
| 2003/0092489 A1 | 5/2003 | Veradej |
| 2003/0095689 A1 | 5/2003 | Volkommer et al. |
| 2003/0098776 A1 | 5/2003 | Friedli |
| 2003/0099379 A1 | 5/2003 | Monk et al. |
| 2003/0099381 A1 | 5/2003 | Ohba |
| 2003/0103652 A1 | 6/2003 | Lee et al. |
| 2003/0107097 A1 | 6/2003 | McArthur et al. |
| 2003/0107645 A1 | 6/2003 | Yoon |
| 2003/0108224 A1 | 6/2003 | Ike |
| 2003/0108225 A1 | 6/2003 | Li |
| 2003/0115148 A1 | 6/2003 | Takhar |
| 2003/0115459 A1 | 6/2003 | Monk |
| 2003/0116630 A1 | 6/2003 | Carey et al. |
| 2003/0118212 A1 | 6/2003 | Min et al. |
| 2003/0118217 A1 | 6/2003 | Kondo et al. |
| 2003/0123711 A1 | 7/2003 | Kim et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0131265 A1 | 7/2003 | Bhakta |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0152252 A1 | 8/2003 | Kondo et al. |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0169901 A1 | 9/2003 | Pavlidis et al. |
| 2003/0169907 A1 | 9/2003 | Edwards et al. |
| 2003/0173408 A1 | 9/2003 | Mosher, Jr. et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0195935 A1 | 10/2003 | Leeper |
| 2003/0198368 A1 | 10/2003 | Kee |
| 2003/0200180 A1 | 10/2003 | Phelan, III et al. |
| 2003/0210139 A1 | 11/2003 | Brooks et al. |
| 2003/0210802 A1 | 11/2003 | Schuessier |
| 2003/0218719 A1 | 11/2003 | Abourizk et al. |
| 2003/0225711 A1 | 12/2003 | Paping |
| 2003/0228898 A1 | 12/2003 | Rowe |
| 2003/0233556 A1 | 12/2003 | Angelo et al. |
| 2003/0235326 A1 | 12/2003 | Morikawa et al. |
| 2003/0235411 A1 | 12/2003 | Morikawa et al. |
| 2003/0236120 A1 | 12/2003 | Reece et al. |
| 2004/0001614 A1 | 1/2004 | Russon et al. |
| 2004/0002894 A1 | 1/2004 | Kocher |
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0012760 A1 | 1/2004 | Mihashi et al. |
| 2004/0019570 A1 | 1/2004 | Bolle et al. |
| 2004/0023664 A1 | 2/2004 | Mirouze et al. |
| 2004/0023709 A1 | 2/2004 | Beaulieu et al. |
| 2004/0025030 A1 | 2/2004 | Corbett-Clark et al. |
| 2004/0025031 A1 | 2/2004 | Ooi et al. |
| 2004/0025053 A1 | 2/2004 | Hayward |
| 2004/0029564 A1 | 2/2004 | Hodge |
| 2004/0030930 A1 | 2/2004 | Nomura |
| 2004/0035123 A1 | 2/2004 | Kim et al. |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0049687 A1 | 3/2004 | Orsini et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0104266 A1 | 6/2004 | Bolle et al. |
| 2004/0117636 A1 | 6/2004 | Cheng |
| 2004/0133804 A1 | 7/2004 | Smith et al. |
| 2004/0146187 A1 | 7/2004 | Jeng |
| 2004/0148526 A1 | 7/2004 | Sands et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0169817 A1 | 9/2004 | Grotehusmann et al. |
| 2004/0172541 A1 | 9/2004 | Ando et al. |
| 2004/0174070 A1 | 9/2004 | Voda et al. |

| | | | | | |
|---|---|---|---|---|---|
| 2004/0190759 A1 | 9/2004 | Caldwell | EP | 1041506 | 10/2000 |
| 2004/0193893 A1 | 9/2004 | Braithwaite et al. | EP | 1041523 | 10/2000 |
| 2004/0219902 A1 | 11/2004 | Lee et al. | EP | 1126403 | 8/2001 |
| 2004/0233038 A1 | 11/2004 | Beenau et al. | EP | 1139270 | 10/2001 |
| 2004/0240711 A1 | 12/2004 | Hamza et al. | EP | 1237117 | 9/2002 |
| 2004/0252866 A1 | 12/2004 | Tisse et al. | EP | 1477925 | 11/2004 |
| 2004/0255168 A1 | 12/2004 | Murashita et al. | EP | 1635307 | 3/2006 |
| 2005/0008200 A1 | 1/2005 | Azuma et al. | GB | 2369205 | 5/2002 |
| 2005/0008201 A1 | 1/2005 | Lee et al. | GB | 2371396 | 7/2002 |
| 2005/0012817 A1 | 1/2005 | Hampapur et al. | GB | 2375913 | 11/2002 |
| 2005/0029353 A1 | 2/2005 | Isemura et al. | GB | 2402840 | 12/2004 |
| 2005/0052566 A1 | 3/2005 | Kato | GB | 2411980 | 9/2005 |
| 2005/0055582 A1 | 3/2005 | Bazakos et al. | JP | 9161135 | 6/1997 |
| 2005/0063567 A1 | 3/2005 | Saitoh et al. | JP | 9198545 | 7/1997 |
| 2005/0084137 A1 | 4/2005 | Kim et al. | JP | 9201348 | 8/1997 |
| 2005/0084179 A1 | 4/2005 | Hanna et al. | JP | 9147233 | 9/1997 |
| 2005/0099288 A1 | 5/2005 | Spitz et al. | JP | 9234264 | 9/1997 |
| 2005/0102502 A1 | 5/2005 | Sagen | JP | 9305765 | 11/1997 |
| 2005/0110610 A1 | 5/2005 | Bazakos et al. | JP | 9319927 | 12/1997 |
| 2005/0125258 A1 | 6/2005 | Yellin et al. | JP | 10021392 | 1/1998 |
| 2005/0127161 A1 | 6/2005 | Smith et al. | JP | 10040386 | 2/1998 |
| 2005/0129286 A1 | 6/2005 | Hekimian | JP | 10049728 | 2/1998 |
| 2005/0134796 A1 | 6/2005 | Zelvin et al. | JP | 10137219 | 5/1998 |
| 2005/0138385 A1 | 6/2005 | Friedli et al. | JP | 10137221 | 5/1998 |
| 2005/0138387 A1 | 6/2005 | Lam et al. | JP | 10137222 | 5/1998 |
| 2005/0146640 A1 | 7/2005 | Shibata | JP | 10137223 | 5/1998 |
| 2005/0151620 A1 | 7/2005 | Neumann | JP | 10248827 | 9/1998 |
| 2005/0152583 A1 | 7/2005 | Kondo et al. | JP | 10269183 | 10/1998 |
| 2005/0193212 A1 | 9/2005 | Yuhara | JP | 11047117 | 2/1999 |
| 2005/0199708 A1 | 9/2005 | Friedman | JP | 11089820 | 4/1999 |
| 2005/0206501 A1 | 9/2005 | Farhat | JP | 11200684 | 7/1999 |
| 2005/0206502 A1 | 9/2005 | Bernitz | JP | 11203478 | 7/1999 |
| 2005/0207614 A1 | 9/2005 | Schonberg et al. | JP | 11213047 | 8/1999 |
| 2005/0210267 A1 | 9/2005 | Sugano et al. | JP | 11339037 | 12/1999 |
| 2005/0210270 A1 | 9/2005 | Rohatgi et al. | JP | 2000005149 | 1/2000 |
| 2005/0210271 A1 | 9/2005 | Chou et al. | JP | 2000005150 | 1/2000 |
| 2005/0238214 A1 | 10/2005 | Matsuda et al. | JP | 2000011163 | 1/2000 |
| 2005/0240778 A1 | 10/2005 | Saito | JP | 2000023946 | 1/2000 |
| 2005/0248725 A1 | 11/2005 | Ikoma et al. | JP | 2000083930 | 3/2000 |
| 2005/0249385 A1 | 11/2005 | Kondo et al. | JP | 2000102510 | 4/2000 |
| 2005/0255840 A1 | 11/2005 | Markham | JP | 2000102524 | 4/2000 |
| 2006/0093190 A1 | 5/2006 | Cheng et al. | JP | 2000105830 | 4/2000 |
| 2006/0147094 A1* | 7/2006 | Yoo ............................ 382/117 | JP | 2000107156 | 4/2000 |
| 2006/0165266 A1 | 7/2006 | Hamza | JP | 2000139878 | 5/2000 |
| 2006/0274919 A1 | 12/2006 | LoIacono et al. | JP | 2000155863 | 6/2000 |
| 2007/0036397 A1 | 2/2007 | Hamza | JP | 2000182050 | 6/2000 |
| 2007/0140531 A1 | 6/2007 | Hamza | JP | 2000185031 | 7/2000 |
| 2007/0160266 A1 | 7/2007 | Jones et al. | JP | 2000194972 | 7/2000 |
| 2007/0189582 A1 | 8/2007 | Hamza et al. | JP | 2000237167 | 9/2000 |
| 2007/0206840 A1 | 9/2007 | Jacobson | JP | 2000242788 | 9/2000 |
| 2007/0274570 A1 | 11/2007 | Hamza | JP | 2000259817 | 9/2000 |
| 2007/0274571 A1 | 11/2007 | Hamza | JP | 2000356059 | 12/2000 |
| 2007/0286590 A1 | 12/2007 | Terashima | JP | 2000357232 | 12/2000 |
| 2008/0005578 A1 | 1/2008 | Shafir | JP | 2001005948 | 1/2001 |
| 2008/0075334 A1 | 3/2008 | Determan et al. | JP | 2001067399 | 3/2001 |
| 2008/0075441 A1 | 3/2008 | Jelinek et al. | JP | 2001101429 | 4/2001 |
| 2008/0104415 A1 | 5/2008 | Palti-Wasserman et al. | JP | 2001101275 | 6/2001 |
| 2008/0148030 A1 | 6/2008 | Goffin | JP | 2001222661 | 8/2001 |
| 2008/0211347 A1 | 9/2008 | Wright et al. | JP | 2001292981 | 10/2001 |
| 2008/0252412 A1 | 10/2008 | Larsson et al. | JP | 2001297177 | 10/2001 |
| 2008/0267456 A1 | 10/2008 | Anderson | JP | 2001358987 | 12/2001 |
| 2009/0046899 A1 | 2/2009 | Northcott et al. | JP | 2002119477 | 4/2002 |
| 2009/0092283 A1 | 4/2009 | Whillock et al. | JP | 2002133415 | 5/2002 |
| 2009/0316993 A1 | 12/2009 | Brasnett et al. | JP | 2002153444 | 5/2002 |
| 2010/0002913 A1 | 1/2010 | Hamza | JP | 2002153445 | 5/2002 |
| 2010/0033677 A1 | 2/2010 | Jelinek | JP | 2002260071 | 9/2002 |
| 2010/0034529 A1 | 2/2010 | Jelinek | JP | 2002271689 | 9/2002 |
| 2010/0142765 A1 | 6/2010 | Hamza | JP | 2002286650 | 10/2002 |
| 2010/0182440 A1 | 7/2010 | McCloskey | JP | 2002312772 | 10/2002 |
| 2010/0239119 A1 | 9/2010 | Bazakos et al. | JP | 2002329204 | 11/2002 |
| | | | JP | 2003006628 | 1/2003 |
| | FOREIGN PATENT DOCUMENTS | | JP | 2003036434 | 2/2003 |
| EP | 0878780 | 11/1998 | JP | 2003108720 | 4/2003 |
| EP | 0899680 | 3/1999 | JP | 2003108983 | 4/2003 |
| EP | 0910986 | 4/1999 | JP | 2003132355 | 5/2003 |
| EP | 0962894 | 12/1999 | JP | 2003150942 | 5/2003 |
| EP | 1018297 | 7/2000 | JP | 2003153880 | 5/2003 |
| EP | 1024463 | 8/2000 | JP | 2003242125 | 8/2003 |
| EP | 1028398 | 8/2000 | JP | 2003271565 | 9/2003 |

| | | |
|---|---|---|
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | 0062239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Avcibas et al., "Steganalysis Using Image Quality Metrics," IEEE Transactions on Image Processing, vol. 12, No. 2, pp. 221-229, Feb. 2003.

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Daugman, "How Iris Recognition Works," IEEE 2002 International Conference on Image Processing, vol. I of III, 6 pages, Sep. 22-25, 2002.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

http://www.newscientisttech.com/article/dn11110-invention-covert-iris-sc, "Invention: Covert Iris Scanner," 3 pages, printed Feb. 8, 2007.

Jalaja et al., "Texture Element Feature Characterizations for CBIR," IEEE, pp. 733-736, 2005.

Kalka et al., "Image Quality Assessment for Iris Biometric," Proc. of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.

Lau et al., "Finding a Small Number of Regions in an Image Using Low-Level Features," Pattern Recognition 35, pp. 2323-2339, 2002.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Sony, "Network Color Camera, SNC-RZ30N (NTSC)," 6 pages, Aug. 2002.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

Bonney et al., "Iris Pattern Extraction Using Bit Planes and Standard Deviations," IEEE, pp. 582-586, 2004.

Camus et al.; "Reliable and Fast Eye Finding in Close-up Images," IEEE, pp. 389-394, 2002.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

L. Ma, et al.: *Personal Identification Based on Iris Texture Analysis*, IEEE Transactions on Pattern Analysis and Machine Intelligence, vol. 25, No. 12 (Dec. 2003) (pp. 1519-1533).

L. Masek: *Recognition of Human Iris Patterns for Biometric Identification* (Report submitted for Bachelor of Engineering degree, School of Computer Science and Software Engineering, The University of Western Australia) (2003) (56 pp.).

Y. Du, et al.: *A One-Dimensional Approach for Iris Identification*(undated) (11 pp.).

J. Daugman, *Results from 200 billion iris cross-comparisons*, Technical Report No. 635, University of Cambridge Computer Laboratory (Jun. 2005) (8 pps.).

Z. Sun, *Robust Encoding of Local Ordinal Measures: A General Framework of Iris Recognition*, (undated) (13 pp.).

J. Huang, et al. *Iris Model Based on Local Orientation Description* (undated) (5 pp.).

Y-A Huang, *An Efficient Iris Recognition System*, Proceedings of the First International Conference on Machine Learning and Cybernetics, Beijing, Nov. 4-5, 2002 (pp. 450-454).

J. Cui, et al.: *An Appearance-Based Method for Iris Detection* (undated) (6 pp.).

J. Cui, et al.: *A Fast and Robust Iris Localization Method Based on Texture Segmentation* (undated) (8 pp.).

U.S. Appl. No. 13/077,821, filed Mar. 30, 2011.

Freeboy, "Adaptive Optics Speeds Up Airport Immigration," Optics.org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

AOptix Technologies, "Introducing the AOptix InSight 2 Meter Iris Recognition System," 6 pages, 2010.

Belhumeur et al., "Eigenfaces vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Sparse 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., Pages 556-559 in Book Entitled "Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

* cited by examiner 1100110011001010   1100000011101010

INVARIANT RADIAL IRIS SEGMENTATION

This application claims the benefit of U.S. Provisional Patent Application Ser. No. 60/778,770, filed Mar. 3, 2006.

STATEMENT OF GOVERNMENT INTEREST

This invention was made with government support under Contract No. F10801 EE5.2. The Government has certain rights in the invention.

RELATED APPLICATIONS

This application is related to U.S. Non-Provisional patent application Ser. No. 11/043,366, entitled "A 1D Polar Based Segmentation Approach," filed Jan. 26, 2005. The disclosure of the related document is hereby fully incorporated by reference.

FIELD OF THE INVENTION

The invention is directed towards biometric recognition, specifically to an improved approach to radial iris segmentation.

BACKGROUND OF THE INVENTION

Biometrics is the study of automated methods for uniquely recognizing humans based upon one or more intrinsic physical or behavioral traits. In information technology, biometric authentications refer to technologies that measure and analyze human physical characteristics for authentication purposes. Examples of physical characteristics include fingerprints, eye retinas and irises, facial patterns and hand measurements.

A leading concern of existing biometric systems is that individual features that identify humans from others can be easily missed due to the lack of accurate acquisition of the biometric data, or due to the deviation of operational conditions. Iris recognition has been seen as a low error, high success method of retrieving biometric data. However, iris scanning and image processing has been costly and time consuming. Fingerprinting, facial patterns and hand measurements have afforded cheaper, quicker solutions.

During the past few years, iris recognition has matured sufficiently to allow it to compete economically with other biometric methods. However, inconsistency of acquisition conditions of iris images has led to rejecting valid subjects or validating imposters, especially when the scan is done under uncontrolled environmental conditions.

In contrast, under controlled conditions, iris recognition has proven to be very effective. This is true because iris recognition systems rely on more distinct features than other biometric techniques such as facial patterns and hand measurements and therefore provides a reliable solution by offering a much more discriminating biometric data set.

Although prototype systems and techniques had been proposed in the early 1980s, it was not until research in the 1990s that autonomous iris recognition systems were developed. The concepts discovered in this research have since been implemented in field devices. The overall approach is based on the conversion of a raw iris image into a numerical code that can be easily manipulated. The robustness of this approach and the following alternative approaches rely heavily on accurate iris segmentation. Iris segmentation is the process of locating and isolating the iris from the other parts of the eye. Iris segmentation is essential to the system's use.

Computing iris features requires a high quality segmentation process that focuses on the subject's iris and properly extracts its borders. Such an acquisition process is sensitive to the acquisition conditions and has proven to be a very challenging problem. Current systems try to maximize the segmentation accuracy by constraining the operation conditions. Constraints may be placed on the lighting levels, position of the scanned eye, and environmental temperature. These constraints can lead to a more accurate iris acquisition, but are not practical in all real time operations.

Significant progress has been made to mitigate this problem; however, these developments were mostly built around the original methodology, namely, circular/elliptical contour segmentation that has proven to be problematic under uncontrolled conditions. Other work introduces concepts which compete with the above discussed methodology, but still suffer similar issues with segmentation robustness under uncontrolled conditions.

Thus, it would be desirable to have a method that provides an iris recognition technique that is well suited for iris-at-a-distance applications, i.e. a system utilizing unconstrained conditions, which still provides an accurate, real-time result based on the collected biometric data.

SUMMARY OF THE INVENTION

In accordance with the principles of the present invention, a new feature extraction technique is presented along with a new encoding scheme resulting in an improved biometric algorithm. This new extraction technique is based on a simplified polar segmentation (POSE). The new encoding scheme utilizes the new extraction technique to extract actual local iris features using a process with low computational load.

The encoding scheme does not rely on accurate segmentation of the outer bounds of the iris region, which is essential to prior art techniques. Rather, it relies on the identification of peaks and valleys in the iris (i.e., the noticeable points of change in color intensity in the iris). Advantageously, regardless of a chosen filter, the encoding scheme does not rely on the exact location of the occurrence of peaks detected in the iris, but rather relies on the magnitude of detected peaks relative to a referenced first peak. Since this algorithm does not rely on the exact location of pattern peaks/valleys, it does not require accurate segmentation of the outer boundary of the iris, which in turn eliminates the need for a normalization process.

The overall function of the present invention can be summarized as follows. First, the iris is preprocessed and then localized using an enhanced segmentation process based on a POSE approach, herein referred to as invariant radial POSE segmentation. During the segmentation process, all obscurant parts (i.e. pupil, eyelid, eyelashes, sclera and other non-essential parts of the eye) are dropped out of the analysis if the obscuration reaches the inner border of the iris. Lighting correction and contrast improvement are processed to compensate for differences in image lighting and reflective conditions. The captured iris image is unwrapped into several radial segments and each segment is analyzed to generate a one dimensional dataset representing the peak and/or valley data for that segment. The peak and/or valley data is one dimensional in the sense that peaks and/or valleys are ordered in accordance with their position along a straight line directed radially outward from the center of the iris. In one embodiment, the iris image is unwrapped into a one-dimensional polar representation of the iris signature, in which the data for only a single peak per radial segment is stored. In one implementation, the magnitude of the outermost peak from the pupil-iris border per segment is stored. In another implementation, the magnitude of the largest peak in the segment is stored. In another embodiment, the data for a plurality of peaks and/or valleys is stored per radial segment. In this embodiment, each peak and/or valley is recorded as a one bit value indicating its magnitude relative to another peak and/or valley in the segment, such as the immediately preceding peak/valley along the one dimensional direction. The data for all of the radial segments is concatenated into a template representing the data for the entire iris scan. That template can be compared to stored templates to find a match.

DETAILED DESCRIPTION OF THE INVENTION

A leading concern of existing biometric systems is that individual features which identify humans from others can be easily missed due to the lack of accurate data acquisition or due to deviations in operational conditions. During the past few years, iris recognition has matured to a point that allows it to compete with more common biometric means, such as fingerprinting. However, inconsistencies in acquisition conditions of iris images often leads to rejecting valid subjects or validating imposters, especially under uncontrolled operational environments, such as environments where the lighting is not closely controlled. In contrast, under controlled conditions, iris recognition has proven to be very effective. This is so because iris recognition systems rely on more distinct features than other common biometric means, providing a reliable solution by offering a more discriminating biometric.

Figure 1:
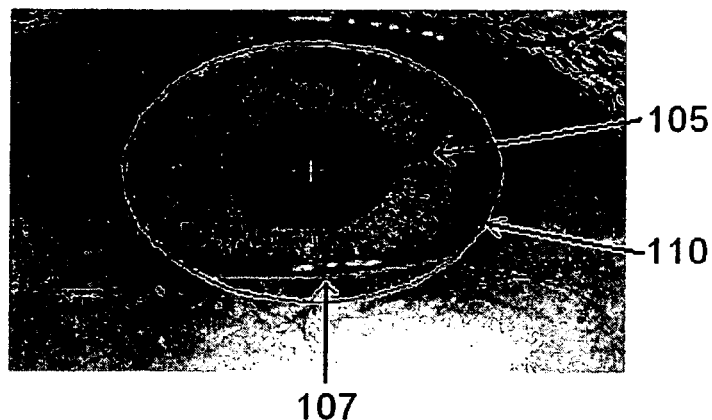
FIG. 1 illustrates a scanned iris image based on existing techniques.

FIG. 1 shows a scanned eye image with the borders identified according to conventional prior art segmentation techniques. Here, iris 105 is defined by outer iris border 110. However, outer iris border 110 is obstructed by the eyelid at 107 and a true border cannot be determined. The system must estimate the missing portion of the outer iris border 110. Computing iris features requires a high-quality segmentation process that focuses on the subject's iris and properly extracts its borders. Such a process is sensitive to the acquisition conditions and has proven to be a challenging problem (especially for uncooperative subjects that are captured at a distance). By constraining operational conditions, such as carefully controlling lighting and the position of a subject's eye, current systems attempt to resolve segmentation problems, but these approaches are not always practical.

The major downfall of these prior art techniques is that the system focuses on the outer border of the iris to normalize the iris scaling to allow for uniform matching. Due to many factors, including eyelids and eyelashes which may obscure the outer iris border, and lightly colored irises that may be difficult to distinguish from the sclera, the outer border may be impossible to accurately map, resulting in an incorrect segmentation of the subject's iris, which, in turn, negatively impacts the rest of the biometric recognition process. In addition, when applied to uncontrolled conditions, these segmentation techniques result in many errors. Such conditions may include subjects captured at various ranges from the acquisition device or subjects who may not have their eye directly aligned with the imaging equipment.

Figure 2A:
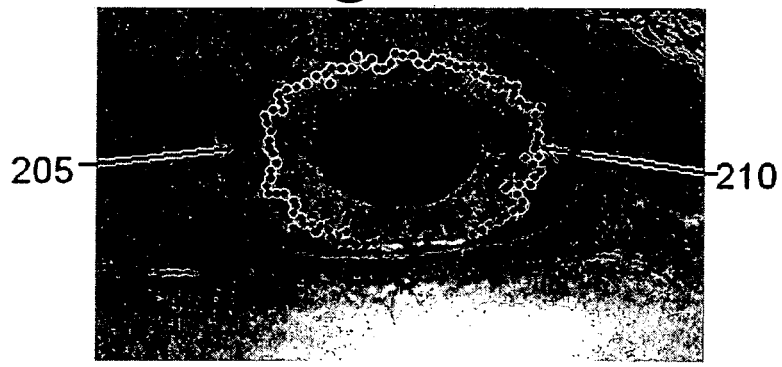
FIG. 2a illustrates a scanned iris image utilizing the principles of the present invention.

FIG. 2A shows a similarly scanned eye image as in FIG. 1. In this figure, principles of the present invention are applied. This approach is based on a simplified polar segmentation (POSE), a newer encoding scheme that does not rely on accurate segmentation of the outer boundary of the iris region. A detailed explanation of POSE can be found in the previously mentioned, related U.S. Non-Provisional patent application Ser. No. 11/043,366, entitled "A 1D Polar Based Segmentation Approach". The present invention utilizes an enhanced POSE technique. This enhanced POSE technique, or invariant radial POSE, focuses on detecting the peaks and valleys of the iris, i.e., the significant discontinuities in color intensity between the pupil and the sclera within defined radial segments of the iris. In other words, a peak is a point where color intensity on either side of that point (in the selected direction) is less than the color intensity at that point (and the discontinuity exceeds some predetermined threshold so as to prevent every little discontinuity from being registered as a recorded peak). Likewise, a valley is a point where color intensity on either side of that point in the selected direction is greater than the color intensity at that point (with the same qualifications).

This technique is referred to as being one dimensional because, rather than collecting two dimensional image data per radial segment as in the prior art, the collected iris data per radial segment has only one signal dimension. This process eliminates the need to: estimate an obstructed outer boundary of the iris; segment the outer bound of the iris; and calculate exact parameters of circles, ellipses, or any other shapes needed to estimate a missing portion of the outer boundary.

Iris 205 is scanned utilizing the invariant radial POSE process. Rather than concentrating on the outer border of the iris as the process in FIG. 1 does, the invariant radial POSE process locates and identifies the peaks and valleys present in the scanned iris and creates an iris map. FIG. 2A helps illustrate one form of iris map that can represent the peak and/or valley data in an iris scan. In FIG. 2A, the data for only one peak is stored per radial segment. To construct an iris map in accordance with this embodiment of the invention, first the iris is segmented into a set number of radial segments, for example 200 segments. Thus, each segment represents a 1.8 degree slice of a complete 360 degree scan of the iris. After each of the 200 segments is analyzed, the data for one characteristic peak in the segment is stored. In the embodiment illustrated in FIGS. 2A and 2B, the peak selected for representation in each radial segment is the peak 210 that is outermost from the pupil-iris border. In alternative embodiments, the selected peak may be the greatest peak (other than the peak at the pupil-iris border), the sharpest peak, or the innermost peak. If the criterion is the outermost peak, it is preferable to use the outermost peak within a predefined distance of the pupil-iris border since, as one gets closer to the iris-sclera border, the peaks and valleys tend to become less distinct and, therefore, less reliable as a criterion for identifying subjects.

Alternately, the data corresponding to valleys instead of peaks may be recorded. In fact, the recorded data need not necessarily even be a peak or valley, but may be any other readily identifiable color or contrast characteristic. The distance from the center of the pupil of whichever peak or valley (or other characteristic) is selected for representation is stored. In a preferred embodiment, the radial distance is reported as a relative value relative to the radial distance of a reference peak from the center of the pupil. In this manner, it does not require a normalization procedure of the iris scan in order to compensate for changes to the iris due to environmental conditions (e.g., pupil dilation, ambient light). In a preferred embodiment of the invention, the reference peak is the peak at the pupil-iris border in that segment, which usually, if not always, will be the greatest peak in the segment.

Figure 2B:
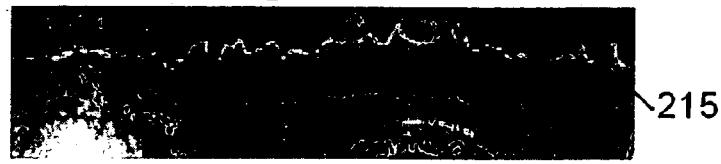
FIG. 2b illustrates the scanned iris image of FIG. 2a mapped into a one dimensional iris map.

FIG. 2B shows the scanned iris mapped into a one dimensional iris map. To construct this iris map, first the iris is segmented into a predetermined number of radial segments, for example 200 segments, each segment representing 1.8 degrees of a complete 360 degree scan of the iris. After each of the 200 segments is analyzed, a reference peak is selected in each segment, the reference peak being the peak at the pupil-iris border in the analyzed radial segment (which usually, if not always, will be the greatest peak in the segment). The iris is unwrapped to create the graph shown in FIG. 2B, with each point 215 representing the aforementioned relative radial distance of the corresponding peak for each of the radial segments.

For purposes of visualization, one may consider the conversion of the peaks and valleys data into the graph shown in FIG. 2B to be an "unwrapping" of the iris about the normal of the pupil-iris border (i.e., perpendicular to the border). For example, the pupil-iris border is essentially a circular border. Imagine that border is a string and unwrapping that string into a straight line with the reference peaks from each radial segment represent as a discrete point 215, as shown in FIG. 2B.

The preceding explanation is merely for the purposes of illustration in helping a person unskilled in the related arts appreciate the process viscerally. Those of skill in the related arts will understand that the conversion of the peaks and valleys information into a one dimensional dataset is actually a rather simple mathematical transformation.

Regardless of conditions, such as lighting and temperature (which affects pupil diameter dilation or contraction), this one dimensional iris representation will be unchanged with respect to the relative location of the reference peaks in each angular segment, but may result in the shifting of the entire curve 215 upwards or downwards. While pupil dilation and other factors may affect the absolute locations of the peaks or valleys (i.e., their actual distances from the pupil border), they will not affect the relative locations of the peaks and valleys in the iris relative to the reference peaks (or valleys).

Figure 4A:
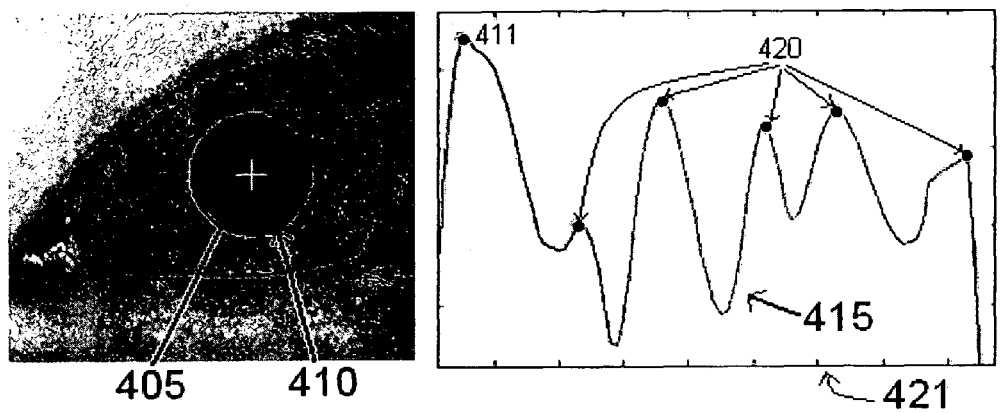
FIG. 4a illustrates a mapping of the iris segmentation process according to the principles of the present invention.

FIG. 4A helps illustrate the formation of an alternative and more robust representation of the scanned iris image data in which the data for multiple peaks, rather than just one characteristic peak, is recorded per radial segment. The center of the pupil is indicated by cross 405. The horizontal or x-axis represents the radial distance from the pupil-iris border (i.e., perpendicular to the pupil-iris border), and the vertical or y-axis represents the derivative of the color intensity. The peak at the pupil-iris border is indicated at 411. All other peaks and valleys in the segment are represented graphically relative to the reference peak so that no data normalization will be necessary.

Note that each radial segment usually will be several pixels wide at the pupil border 410, and become wider as the distance from the pupil-iris border increases. Therefore, in order to generate the one dimensional data represented in the graph of FIG. 4A, the color intensity derivative data represented by the y-axis should be averaged or interpolated over the width of the segment. This representation of the interpolated data is shown in line 415, in which each significant data peak is marked by reference numeral 420.

Figure 4B:
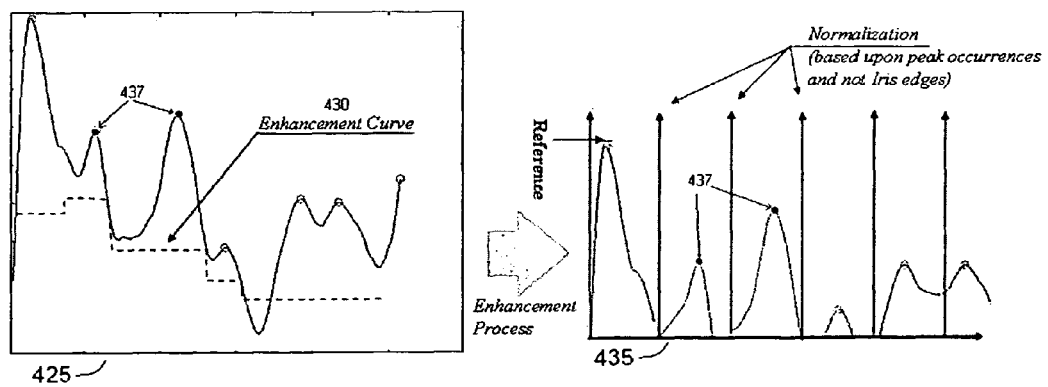
FIG. 4b illustrates an enhanced mapping of the iris scan according to principles of the present invention.

FIG. 4B helps illustrate an even further embodiment. Graph 425 shows a graphical representation of the iris, such as the one illustrated in FIG. 4A. As with the FIG. 4A embodiment, in the feature extraction step, preferably, each individual peak is isolated and recorded with respect to the reference peak. However, in addition, in order to focus solely on the peaks, enhancement curve 430 is removed from the one dimensional iris representation. Enhancement curve 430 is the component of the graph that can be removed without affecting the magnitude of each peak relative to the next peak resulting in a normalized data set focusing solely on the magnitudes of the relative peaks. Using standard wavelet analysis well known to one of ordinary skill in the art, the enhancement curve can be calculated as the approximate component (DC component) of the decomposition of the graph of FIG. 4A. Once the enhancement curve is removed, a segmented graph 435 results, where each peak is represented as a point 437 on the graph. However with the removal of the enhancement curve, graph 425 is now normalized based on peak occurrence. As will be discussed in more detail below, in at least one embodiment of the invention, the peak data will be encoded very efficiently by encoding each peak relative to an adjacent peak using as few as one or two bits per peak. Accordingly, the removed enhancement curve simplifies the processing while preserving all needed information.

Figure 3:
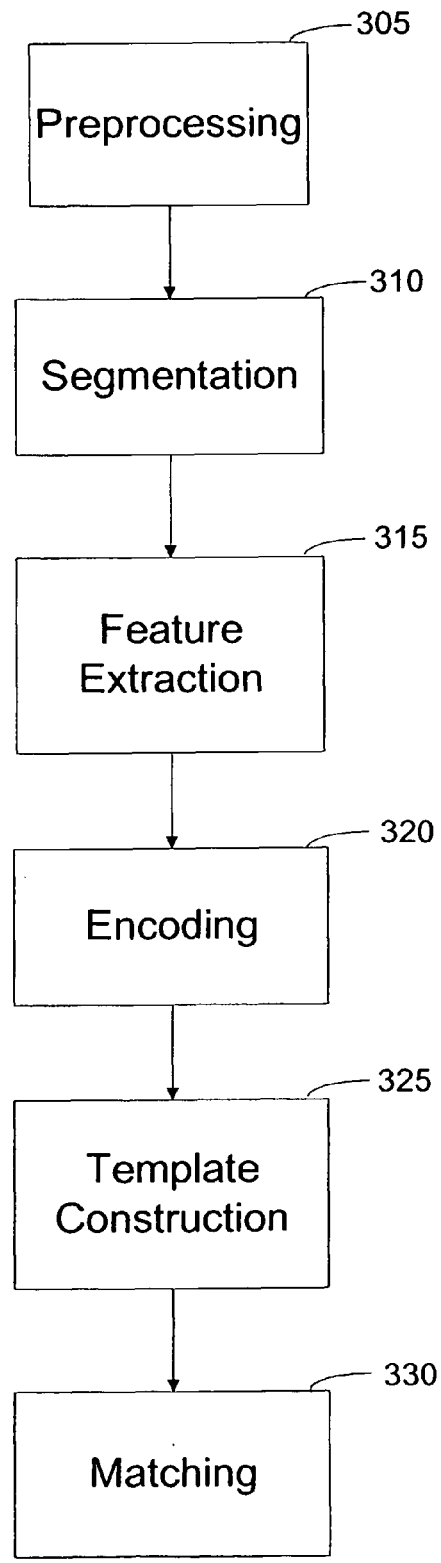
FIG. 3 illustrates a flow chart showing one embodiment of the present invention.

FIG. 3 illustrates a flow chart showing an embodiment of the present invention.

In Step 305, a preprocessing step takes place. The preprocessing may be essentially conventional. In this step, texture enhancements are performed on the scanned image. Obscurant parts of the image, such as pupils, eyelids, eyelashes, sclera and other non-essential parts of the eye are dropped out of the analysis. In order to reduce the side effects of outside illumination, gray scale variations and other artifacts (e.g. colored contact lenses), the system preprocesses the image using a local radial texture pattern (LRTP). However, it should be noted that the texture enhancements are not essential to the operation of the system.

The image is preprocessed using local radial texture pattern similar to, but revised over that proposed in Y. Du, R. Ives, D. Etter, T. Welch, C.-I. Chang, "A one-dimensional approach for iris identification", EE Dept, US Naval Academy, Annapolis, Md., 2004.

$$LRTP(x, y) = I(x, y) - \frac{1}{A}\sum_{\omega} I(x, y)$$

where

I(x, y)=the color intensity of the pixel located at the two dimensional coordinate x, y;

ω=the curve that determines the neighboring points of the pixel x, y; and

A=the area (number of pixels) of ω.

This LRTP approach differs from that method as it avoids discontinuities due to the block analysis that was adopted in the aforementioned reference while preserving the approximation of the true mean value using the window mean instead. The mean of each window of small blocks constitutes a coarse estimate of the background illumination and thus it is subtracted from the actual values of intensities as shown in the equation above.

In Step 310, the Invariant Radial POSE segmentation process is performed. This approach differs from traditional techniques as it does not require iris segmentation at the outer border of the iris, i.e., the iris-sclera border.

Particularly, the process first roughly determines the iris center in the original image, and then refines the center estimate and extracts the edges of the pupil. A technique for locating the center of the pupil is disclosed in aforementioned U.S. patent application Ser. No. 11/043,366, incorporated by reference and need not be discussed further. Techniques for locating the pupil-iris border also are disclosed in the aforementioned patent application and need not be discussed further.

Once the pupil edge has been found, the segmentation process begins. The radial scan of the iris is done in radial segments, e.g., 200 segments of 1.8 degrees each.

After the segmentation and scanning in Step 310, the process proceeds to Step 315. In Step 315, the actual feature extraction occurs based on the segmented image obtained in Step 310. The feature extraction process can be performed, for example, in accordance with any of the three embodiments previously described in connection with FIGS. 2A and B, 4A, and 4B, respectively, which detect changes in the graphical representation of the iris while not relying on the absolute location of the changes' occurrence. Particularly, the absolute locations change as a function of the natural dilation and contraction of the human iris when exposed to variations in environmental light conditions. Therefore, the feature extraction process relies on detecting the peak and valley relative variations in magnitude and their relative locations rather than focusing on their absolute magnitudes or locations. A key advantage of this approach is that it does not require a normalization procedure of the iris scan in order to compensate for changes to the iris due to environmental conditions. A normalization procedure of the iris scan is crucial to prior art iris recognition techniques.

Next, in Step 320, the resulting peak data represented in graph 435 is encoded into an encoded template so that it can later be efficiently compared with stored templates of iris data for known persons. Two encoding alternatives are discussed below in connection with FIGS. 5A and 5B, respectively. These two are shown only for example and are not meant to limit the scope of the present invention.

Figure 5A:
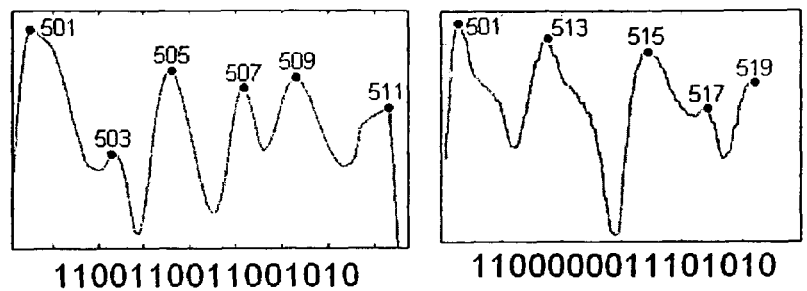
FIG. 5a illustrates a first encoding scheme according to principles of the present invention.
Figure 5B:
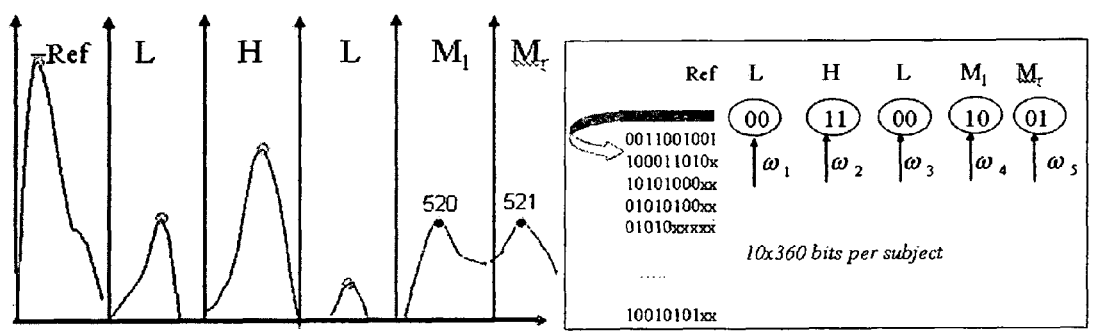
FIG. 5b illustrates a second encoding scheme according to principles of the present invention.

FIGS. 5A and 5B help illustrate the encoding of the peak/valley data set for one radial segment of a scanned iris in accordance with two embodiments of the invention, respectively. As will be discussed in further detail below, each template will comprise a plurality of such data sets, the number of such sets in a template being equal to the number of radial segments. Thus, for instance, if each segment is 1.8°, each template will comprise 200 such data sets.

FIG. 5A illustrates a first encoding scheme which focuses on relative peak amplitude versus the amplitude of the immediately previous peak. FIG. 5A illustrates encoding of the peak data for a single radial segment and shows a data set for that segment. Each data set comprises I×K bits, where K is a number of peaks per radial segment for which we wish to record data and I is the number of bits used to encode each peak. K may be any reasonable number and should be selected to be close to the typical number of peaks expected in a radial segment. In FIG. 5A, K=8.

In this encoding scheme, the first I bits of every data set represents the selected reference peak (the pupil-iris border) and is always set to a first value , e.g., 11, where I=2. As one moves from left to right within the data set, the bits represent peaks that are farther radially outward from the pupil-iris border (i.e., the x axis in FIGS. 2B, 4A, and 4B, which represents distance from the pupil-iris border). If the magnitude of a peak is greater than the magnitude of the previous peak in the graph such as graph 435, the bits representing that peak are set to 11. Otherwise, the bits are set to a second value, e.g., 00. Therefore, the second I bits are essentially guaranteed to be 00 since, in this example, the reference peak is essentially guaranteed to have the greatest magnitude in the segment, and will, thus, always be larger than the next peak. Therefore, in this encoding scheme, the first four bits of each data set are irrelevant to and will not be considered during matching since they will always be identical, namely 1100. In cases where the radial segment does not have at least K peaks, the end of the data set is filled with a one or more third bits sets of a third value, e.g., 10 or 01 that will eventually be masked in the matching step 325. In the case where the radial segment has more than K peaks, only the K peaks closest to the pupil-iris border are encoded.

Thus, referring to the iris segment shown in the first, left-hand graph of FIG. 5A, the sequence representing the peak/valley information for this segment of the iris is 1100110011001010. Particularly, the first two bits represent the magnitude of the reference peak 501 and are always 11, the second two bits represent the magnitude of the first peak 503 in the segment and is essentially guaranteed to be 00 because it will always be smaller than the reference peak, the fifth and sixth bits are 11 because the next peak 505 is greater than the preceding peak 503, the seventh and eighth bits are 00 because the next peak 507 is less than the immediately preceding peak 507, the ninth and tenth bits are 11 because the next peak 509 is greater than the preceding peak 507, the eleventh and twelfth bits are 00 because the next peak 511 is less than the immediately preceding peak 509, and the last four bits are 1010 corresponding to two sets of unknowns because this segment has only five peaks (and the reference peak is the sixth peak represented in the data set).

As another example, referring to the iris segment shown in the second, right-hand graph of FIG. 5A, the sequence representing the peak/valley information for this segment of the iris is 1100000011101010 since the first two bits represent the magnitude of the reference peak 501 and is always 11, the next two bits represent the magnitude of the first peak in the segment 513 and are 00 because it is smaller that the reference peak, the next two bits are 00 because the next peak 515 is greater than the preceding peak 513, the next two bits are 00 because the next peak 517 is less than the immediately preceding peak 517, the next two bits are 11 because the next peak 519 is greater than the preceding peak 517, and last six bits are 101010 because this segment has only five peaks (including the reference peak).

FIG. 5B illustrates a second exemplary encoding scheme according to principles of the present invention. This second encoding scheme also is based on a 2-bit quantization of the magnitude of the filtered peaks, but the peak magnitudes are quantized into three magnitude levels, namely, Low (L), High (H), and Medium (M). Low level magnitude L is assigned 2-bit pattern 00, and High level magnitude H is assigned 2-bit pattern 11. To account for quantization errors, the levels are structured in a way that will allow only one bit error-tolerance to move from one adjacent quantization level to the next. Per this constraint, the scheme has two combinations to represent the medium level, i.e. Mi=10, and Mr=01. Ml represents a case where the valley to the left of the corresponding peak is lower than the valley to the right of the peak and Mr represents a peak where the valley to the right is lower than the valley to the left. Peak 520, for example, would be labeled Mi because the valley to its left is lower than the valley to its right. Peak 521, on the other hand, is an example of a peak that would be labeled Mr because the valley to its left is higher than the valley to its right. However, the two resulting values for Medium level magnitude are treated as equivalent in the matching process. Again, bits are used to complete the bit-vector to reach a predefined vector length, e.g., 10 bits, if there are not enough peeks to fill the data set. Although not shown in the figure, the bits corresponding to unknown peaks may be identified by any reasonable means, such as appending a flag to the end of the data set indicating the number of bits that correspond to unknown peaks. Alternately, the levels may be encoded with three bit quantization in order to provide additional bit combinations for representing unknown. Even further, only one value, e.g., 10, can be assigned for the Medium level, which will leave the two-bit combination 01 for representing unknowns. The unknown bits will be masked during matching, as discussed below. Likewise, if the number of peaks in a radial segment exceeds the number of peeks needed to fill the data set, then the peaks farthest from the pupil are dropped.

Next, in Step 325, a template is constructed by concatenating all of the data sets corresponding to all of the radial segments in the iris scan. Thus, for example, if there are 200 radial segments and the number of bits used for each data set in the encoding scheme to represent the detected peaks is 16 bits, all encoded binary strings are concatenated into a template of 16×200=3400 bits.

Once the data is encoded, the process continues to Step 330. The process determines whether a scanned iris template matches a stored iris template by comparing the similarity between the corresponding bit-templates. A weighted Hamming distance can be used as a metric for recognition to execute the bit-wise comparisons. The comparison algorithm can incorporate a noise mask to mask out the unknown bits so that only significant bits are used in calculating the information measure distance (e.g. Hamming distance). The algorithm reports a value based on the comparison. A higher value reflects fewer similarities in the templates. Therefore, the lowest value is considered to be the best matching score of two templates.

To account for rotational inconsistencies and imaging misalignment, when the information measure of two templates is calculated, one template is shifted left and right bit-wise (along the angular axis) and a number of information measure distance values are calculated from successive shifts. This bit-wise shifting in the angular direction corresponds to rotation of the original iris region by an angular resolution unit. From the calculated information measure distances, only the lowest value is considered to be the best matching score of two templates.

A weighting mechanism can be used in connection with the above mentioned matching. The bits representing the peaks closest to the pupillary region (the pupil borders) are the most reliable/distinct data points and may be weighted higher as they represent more accurate data. All unknown bits, whether present in the template to be matched or in the stored templates, are weighted zero in the matching. This may be done using any reasonable technique. In one embodiment, when two templates are being compared, the bit positions corresponding to unknown bits of one of the two templates are always filled in with bits that match the corresponding bits of the other template.

While the above described embodiments rely on the detection and analysis of a peak in the iris, this is merely shown as an example. Other embodiments can rely on the detection of valleys in the iris, or any other noticeable feature in the iris.

It should be clear to persons familiar with the related arts that the process, procedures and/or steps of the invention described herein can be performed by a programmed computing device running software designed to cause the computing device to perform the processes, procedures and/or steps described herein. These processes, procedures and/or steps also could be performed by other forms of circuitry including, but not limited to, application-specific integrated circuits, logic circuits, and state machines.

Having thus described a particular embodiment of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of identifying a subject by biometric analysis of the iris of an eye, the method comprising the steps of:
   (1) acquiring an image of an iris of the subject;
   (2) radially segmenting the iris image into a plurality of radial segments;
   (3) for each radial segment, determining data for a data set for a single predetermined one dimensional feature within said segment relative to a reference value of said feature within said image; and
   (4) constructing a template for said subject comprising said data for each of said radial segments; and
   wherein:
   at least steps 2-4 are performed using a programmed computing device; and
   said feature is peaks of color intensity within the iris; and
   said data comprises magnitudes of said peaks and their relative locations along a direction radially outward from a center of a pupil in the image of the iris of the subject.

2. The method of claim wherein step (2) comprises the steps of:
   (2.1) determining the center of the pupil of said subject; and
   (2.2) determining a pupil-iris border in said image; and
   (2.3) radially segmenting said iris into a plurality of radial segments of equal angular size.

3. The method of claim 2 wherein said data comprises a distance from said pupil-iris border of a one of said peaks that is the farthest from said pupil-iris border within a predetermined distance of said pupil-iris border.

4. The method of claim 2, wherein said one-dimensional data comprises a distance from said pupil-iris border of a largest one of said peaks in said radial segment.

5. A method of identifying a subject by biometric analysis of the iris of an eye, the method comprising the steps of:
   (1) acquiring an image of an iris of the subject;
   (2) radially segmenting the iris image into a plurality of radial segments;
   (3) for each radial segment, determining data for peaks of color intensity within the radial segment of the iris relative to a reference value of a peak of color intensity within the iris image; and
   (4) constructing a template for the subject comprising the data for each of the radial segments;

(5) encoding the data into a data set; the encoding comprising:
  determining an order of the peaks in the radial segment;
  assigning a first value to each peak having a magnitude that is greater than a preceding peak in the order;
  assigning a second value to each peak having a magnitude that is lesser than a preceding peak in the order; and
  placing the values in said data set in accordance with the order
wherein:
  at least steps 2-4 are performed using a programmed computing device.

6. The method of claim 1 wherein said magnitudes are determined by interpolating data across a width of each radial segment.

7. The method of claim 1 wherein said magnitudes are determined by averaging data across a width of each radial segment.

8. The method of claim 1 wherein said reference value is a value of a one of said peaks corresponding to color intensity at said pupil-iris border.

9. The method of claim 8 wherein step (3) includes the step of removing a decomposition curve from said detected peaks and valleys.

10. The method of claim 1 further comprising the step of:
(5) encoding said data into a data set.

11. The method of claim 10 wherein, in step (5), a first predetermined number of bits are used to represent data of each peak in said radial segment and each said data set comprises a second predetermined number of bits corresponding to a predetermined number of peaks that can be encoded in said data set, and:
  if the number of peaks in said radial segment is less than said predetermined number of peaks that can be encoded, filling said data set with bits indicating an unknown peak; and
  if the number of peaks in said radial segment is greater than said predetermined number of peaks that can be encoded, encoding a subset of said peaks in said radial segment.

12. The method of claim 11 wherein said subset of peaks comprises said peaks in said radial segment that are closest to a pupil of said subject.

13. The method of claim 11 wherein said subset of peaks comprises the largest peaks detected in said radial segment.

14. The method of claim 10 further comprising the step of:
(6) comparing said subject's template to at least one stored template to determine if said subject's template matches said at least one stored template.

15. The method of claim 14 wherein step (6) further comprises the step of weighting each encoded data set such that bits corresponding to peaks closer to said subject's pupil are more heavily weighted than bits farther from said subject's pupil.

16. The method of claim 10 wherein step (5) comprises:
  determining an order of said peaks in said radial segment;
  assigning a first value to each peak having a magnitude that is greater than a preceding peak in said order;
  assigning a second value to each peak having a magnitude that is lesser than a preceding peak in said order; and
  placing said values in said data set in accordance with said order.

17. The method of claim 16, wherein said reference value is a value of one of said peaks corresponding to color intensity at said pupil-iris border and wherein said peaks are ordered in accordance with their distance from the subject's pupil.

18. The method of claim 10, wherein said encoding comprises encoding each peak in said dataset as a two bit sequence wherein a first two bit sequence represents a peak with a high magnitude, a second two bit sequence represents a peak with a low magnitude, and third and fourth two bit sequences both represent a peak with a medium magnitude.

19. The method of claim 18, wherein said encoding is performed with one bit error tolerance.

20. The method of claim 1 wherein step (1) comprises preprocessing said image by performing texture enhancement on said image and dropping out parts of said image that obscure said iris.

21. A non-transitory computer-readable medium for identifying a subject by biometric analysis of the iris of an eye, the product comprising:
  a first computer executable instruction media for acquiring an image of an iris of the subject;
  a second computer executable instruction media for radially segmenting the iris image into a plurality of radial segments;
  a third computer executable instruction media for determining data for a single predetermined one dimensional feature, wherein said feature comprises a peak and/or valley of color intensity within said segment of the iris relative to a reference value of said feature within said image, wherein said reference value is peak or valley of color intensity selected to represent each radical segment, and wherein said data comprises relative magnitudes of at least one peak and/or valley and relative locations of said at least one peak and/or valley along a direction radially outward from a center of a pupil of said subject; and
  a fourth computer executable instruction media for constructing and storing a template for said subject comprising said data set for each of said radial segments.

22. The non-transitory computer-readable medium of claim 21 wherein said second computer executable instructions comprises:
  instructions for determining a center of a pupil of said subject; and
  instructions for determining a pupil-iris border in said image; and
  instructions for radially segmenting said iris into a plurality of radial segments of equal angular size.

23. The non-transitory computer-readable medium of claim 22 wherein said data comprises a distance from said pupil-iris border of one of said peaks that is the farthest from said pupil-iris border within predetermined distance of said pupil-iris border.

24. The non-transitory computer-readable medium of claim 22 wherein said one-dimensional data comprises a distance from said pupil-iris border of a largest one of said peaks in said radial segment.

25. The non-transitory computer readable medium of claim 21 wherein said relative magnitudes are determined by interpolating data across a width of each said radial segment.

26. The non-transitory computer-readable medium of claim 21 wherein said relative magnitudes are determined by averaging data across a width of each radial segment.

27. The non-transitory computer-readable medium of claim 22 wherein said reference value is a value of one of said peaks corresponding to color intensity at said pupil-iris border.

28. The non-transitory computer-readable medium of claim 27 wherein said third computer executable instruction media include instructions for removing a decomposition curve from said detected peaks and valleys.

29. The non-transitory computer-readable medium of claim 28 further comprising:
  a fifth computer executable instruction media include instructions for encoding said data sets.

30. The non-transitory computer-readable medium of claim 29 wherein, in said fifth computer executable instruction media, a first predetermined number of bits are used to represent data of each peak in said radial segment and each said data set comprises a second predetermined number of bits corresponding to a predetermined number of peaks that can be encoded in said data set, and:
  if the number of peaks in said radial segment is less than said predetermined number of peaks that can be encoded, filling said data set with bits indicating an unknown peak; and
  if the number of peaks in said radial segment is greater than said predetermined number of peaks that can be encoded, encoding a subset of said peaks in said radial segment.

31. The non-transitory computer-readable medium of claim 30 wherein said subset of peaks comprises the peaks in said radial segment that are closest to a pupil of said subject.

32. The non-transitory computer-readable medium of claim 30 wherein said subset of peaks comprises the largest peaks detected in said radial segment.

33. The non-transitory computer-readable medium of claim 30 further comprising:
  sixth computer executable instruction media for comparing said subject's template to at least one stored template to determine if said subject's template matches said at least one stored template.

34. The non-transitory computer-readable medium of claim 33 wherein said sixth computer executable instruction further comprise instructions for weighting each encoded data set such that bits corresponding to peaks closer to said subject's pupil are more heavily weighted than bits farther from said subject's pupil.

35. The non-transitory computer-readable medium of claim 29 wherein said fifth computer executable instruction media comprises:
  instructions for determining an order of said peaks in said radial segment;
  instructions for assigning a first value to each peak having a magnitude that is greater than a preceding peak in said order;
  instructions for assigning a second value to each peak having a magnitude that is lesser than a preceding peak in said order; and
  instructions for placing said values in said data set in accordance with said order.

36. The non-transitory computer-readable medium of claim 35, wherein said reference value is a value of a one of said peaks corresponding to color intensity at said pupil-iris border and wherein said peaks are ordered in accordance with their distance from the subject's pupil.

* * * * *